No. 892,719. PATENTED JULY 7, 1908.
J. A. GRATTON.
HOG GAMBREL.
APPLICATION FILED MAY 23, 1907.
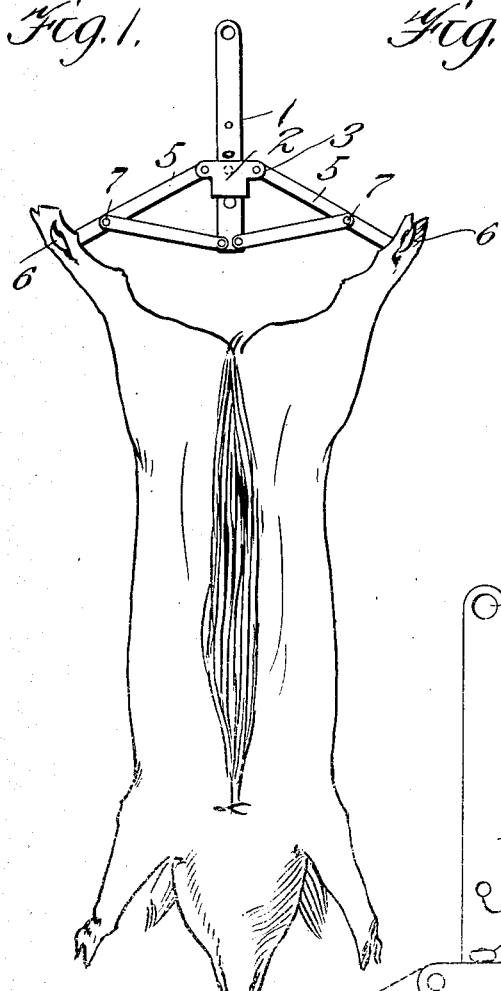
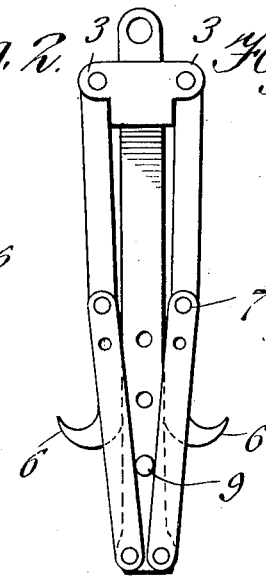
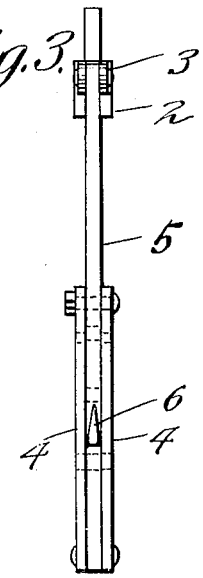
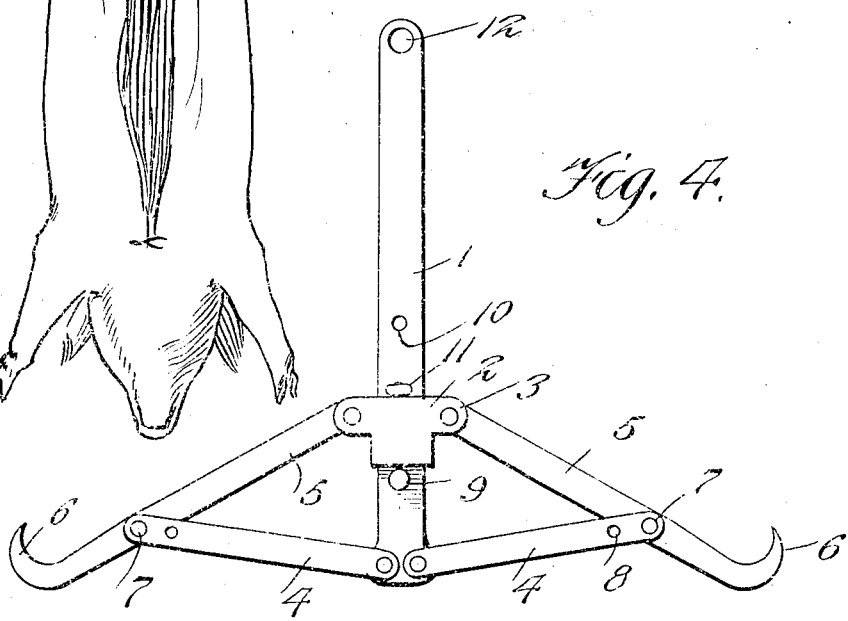
Inventor
Joseph A. Gratton
Witnesses
By Victor J. Evans
Attorney

UNITED STATES PATENT OFFICE.

JOSEPH A. GRATTON, OF KEMPTON, NORTH DAKOTA.

HOG-GAMBREL.

No. 892,719.  Specification of Letters Patent.  Patented July 7, 1908.

Application filed May 23, 1907. Serial No. 375,279.

*To all whom it may concern:*

Be it known that I, JOSEPH A. GRATTON, a citizen of the United States, residing at Kempton, in the county of Grand Forks and State of North Dakota, have invented new and useful Improvements in Hog-Gambrels, of which the following is a specification.

This invention relates to gambrels for supporting the carcass of hogs and other animals and for spreading the same while being butchered or dressed; and it has for its object to provide a gambrel of simple and improved construction which when applied to the hind legs of the carcass will be automatically expanded by the weight supported thereon so as to spread the carcass for convenience in dressing the same.

Further objects of the invention are to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawing, Figure 1 is a front view showing the carcass of a butchered animal suspended by the improved gambrel. Fig. 2 is a front view showing the gambrel collapsed or folded. Fig. 3 is a side view of the same. Fig. 4 is a front view showing the gambrel expanded.

Corresponding parts in the several figures are denoted by like characters of reference.

The improved gambrel includes a central bar or body 1 upon which is fitted a vertically slidable sleeve 2 provided at each side with a pair of laterally extending lugs or ears 3—3. Pivotally connected with the lower end of the bar or body 1, at each side of said bar or body, are pairs of links 4—4. Supported pivotally by the pairs of ears or lugs 3—3 are the spreading rods 5—5 having terminal hooks 6 adapted for engagement with the tendons of the hind legs of the carcass that is to be suspended; the rods 5—5 are connected, intermediate their ends, with the pairs of links 4—4 by means of pins or pivotal members 7 for the reception of which the links 4 are provided each with a plurality of perforations 8, thus enabling the rods 5 to be so adjusted as to be capable of varying degrees of extension. The movement of the sleeve 2 in a downward direction upon the bar or body 1 is limited by a stop 9 extending transversely through said bar or body with which it is permanently connected; the said bar or body is provided with apertures 10 for the reception of a stop member such as a cotter pin 11 which may be adjusted in any one of said apertures for the purpose of securing the sleeve 2 against movement in an upward direction.

The operation of the improved device will be readily understood from the foregoing description taken in connection with the drawings. The hooks 6 at the outer or free ends of the spreading rods may be readily placed in engagement with the hind legs of the carcass which may be hoisted by hoisting means connected with the aperture 12 near the upper extremity of the bar or body 1. When the weight of the carcass is imposed upon the spreading rods the sleeve 2 will move in a downward direction upon the bar or body 1, and the spreading rods will be expanded, by the action of the pairs of links 4—4 in an outward direction, thus spreading the carcass as will be readily seen by reference to Fig. 1 of the drawings, and supporting it in a convenient position for dressing.

This improved device is simple in construction and may be manufactured at a moderate expense. Its utility will be readily apparent to those familiar with this class of devices. The body bar is formed in a single piece, and it is therefore strong and rigid; the sleeve slidable upon the body bar affords a very strong and durable support for the spreading rods and each of the latter, in turn, is very firmly supported by a pair of links connecting it with the lower end of the body bar. The stop member 9 limits the downward movement of the sleeve 2, and prevents the latter from striking and injuring the links at the points where they are connected pivotally with the body bar; and the cotter pin 11 prevents accidental movement of the sleeve in an upward direction when the device is in use, thus preventing accidental disengagement of the carcass from the spreading hooks.

Having thus fully described the invention, what is claimed as new is:—

In a device of the character described, a body bar, a sleeve mounted to slide on said bar and having laterally extending lugs, spreading rods pivotally connected to said lugs, said rods having upturned terminal hooks on their outer ends, pairs of links connected adjustably to the spreading rods and pivotally connected to the lower end of the body member, pivotal pins connecting the links adjustably with the spreading rods, a stop extending transversely through the body member to limit the downward movement of the sleeve, and an adjustable pin for securing the sleeve against upward movement from the body bar.

In testimony whereof, I affix my signature in presence of two witnesses.

JOSEPH A. GRATTON.

Witnesses:
EDW. H. MAETZOLD,
M. E. MAETZOLD.